United States Patent [19]

Oprandi et al.

[11] 4,017,895
[45] Apr. 12, 1977

[54] METHOD OF DETECTING DEFECTS IN READ OUT SIGNALS, AND APPARATUS FOR IMPLEMENTING THE SAME

[75] Inventors: Pierre Oprandi; René Romeas, both of Paris, France

[73] Assignee: Thomson-Brandt, Paris, France

[22] Filed: July 21, 1975

[21] Appl. No.: 597,634

[30] Foreign Application Priority Data

July 23, 1974 France .............................. 74.25491

[52] U.S. Cl. ................................ 358/127; 358/128; 360/38
[51] Int. Cl.² .......................................... H04N 5/76
[58] Field of Search .......... 360/38, 51; 178/6.6 DC, 178/69.5 TV, 69.5 R, 69.5 DC, 6.7 A; 179/100.3 V, 100.1 R; 358/128; 340/173 LT, 173 LM

[56] References Cited

UNITED STATES PATENTS

| 3,071,723 | 1/1963 | Gabor | 360/38 |
|---|---|---|---|
| 3,080,487 | 3/1963 | Mellott et al. | 360/38 |
| 3,474,418 | 10/1969 | Jensen | 360/38 |
| 3,865,981 | 2/1975 | Welch et al. | 360/38 |
| 3,909,518 | 9/1975 | Baker | 360/38 |
| 3,912,858 | 10/1975 | Kenney | 178/6.6 DC |
| 3,925,605 | 12/1975 | Rennick | 178/6.6 DC |
| 3,925,811 | 12/1975 | Kenney | 178/6.6 DC |
| 3,947,873 | 3/1976 | Buchan | 360/38 |

Primary Examiner—Raymond F. Cardillo, Jr.
Attorney, Agent, or Firm—Cushman, Darby & Cushman

[57] ABSTRACT

The present invention relates to a method and apparatus for detecting defects in signals produced by the read-out of information recorded upon a data carrier. The defects correspond either to an abnormally high frequency or to an abnormally low frequency. Detection is achieved by means of one, two or three monostable switching circuits supplied with trigger pulses originating from squared read-out signals. The signal produced by the last monostable switching circuit is used for controlling a defect correcting circuit.

9 Claims, 6 Drawing Figures

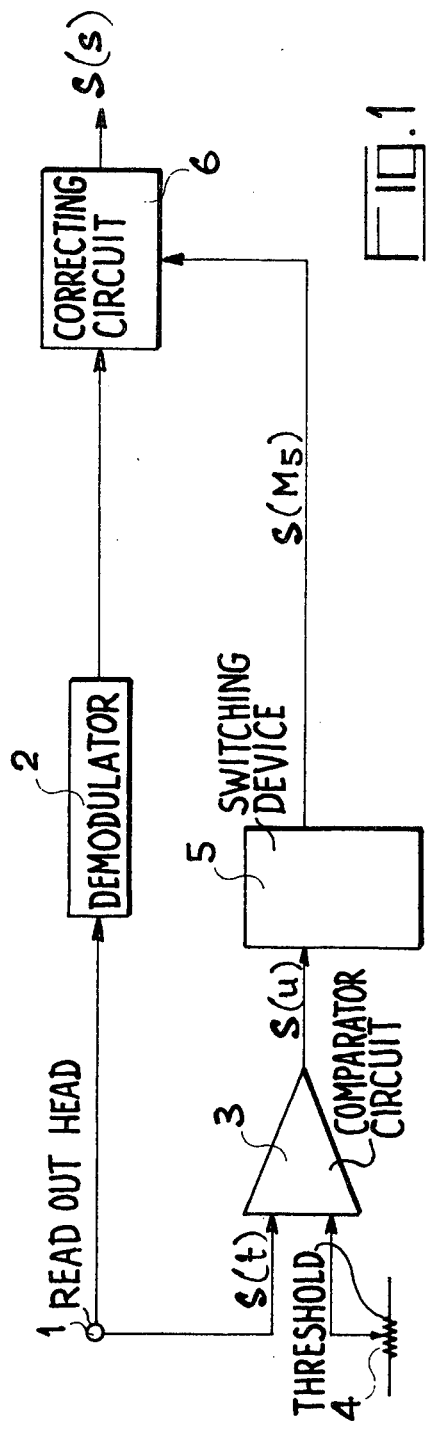
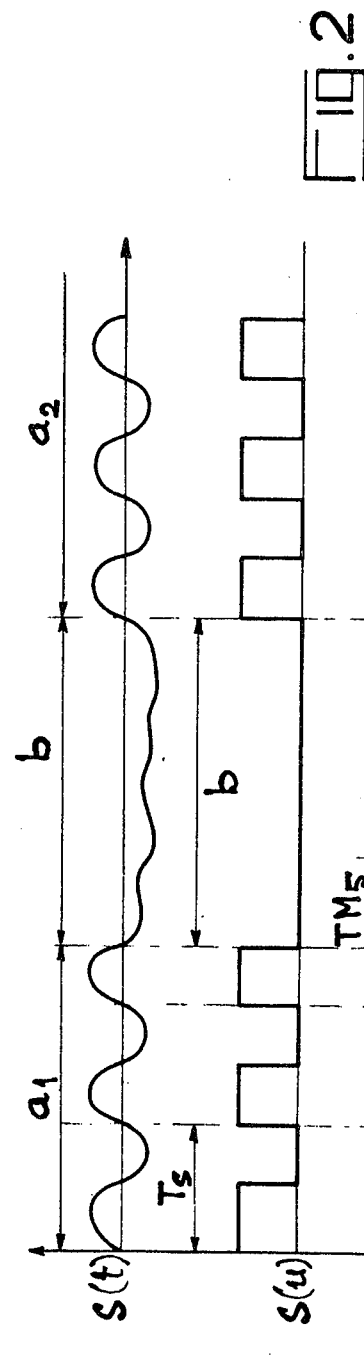

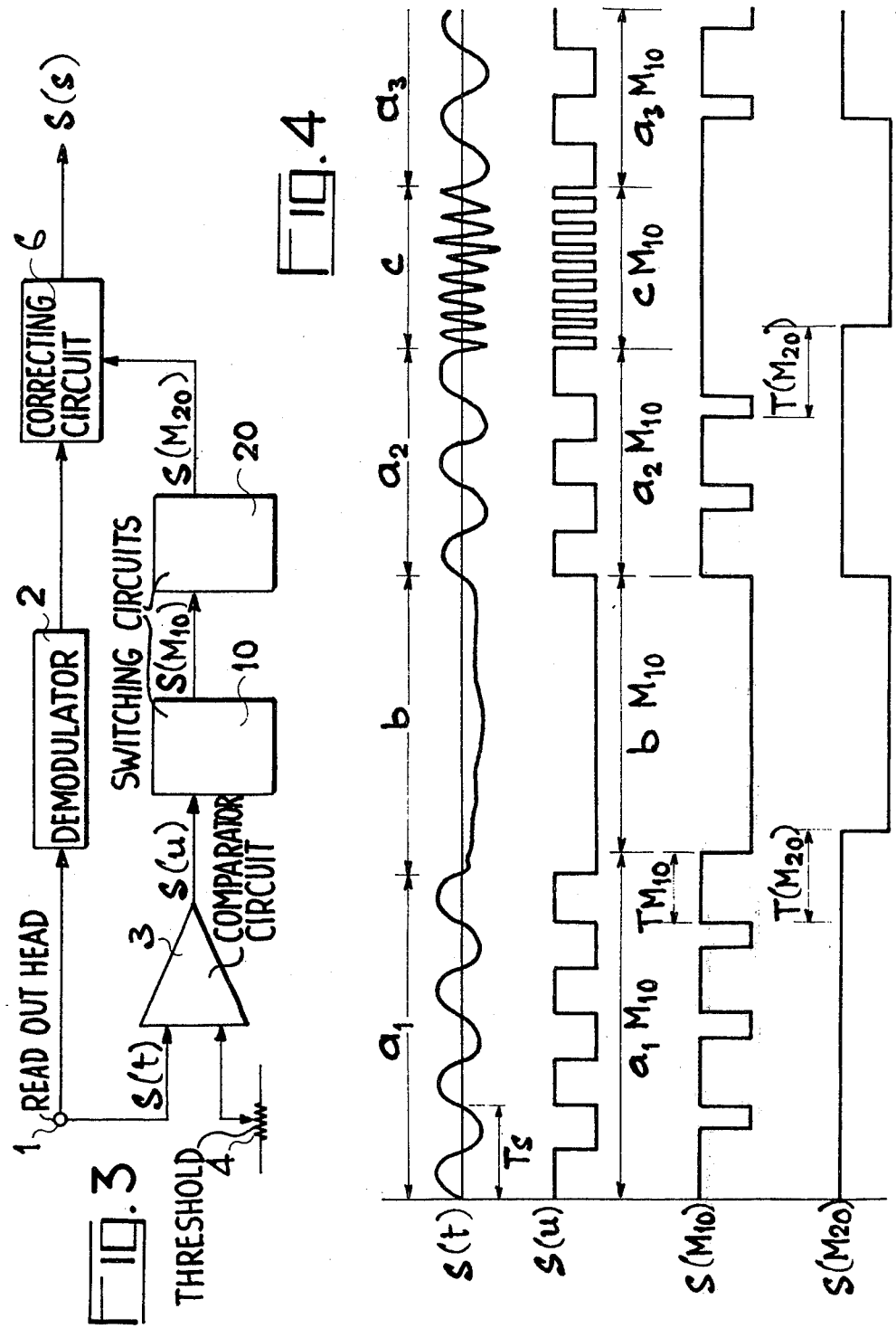

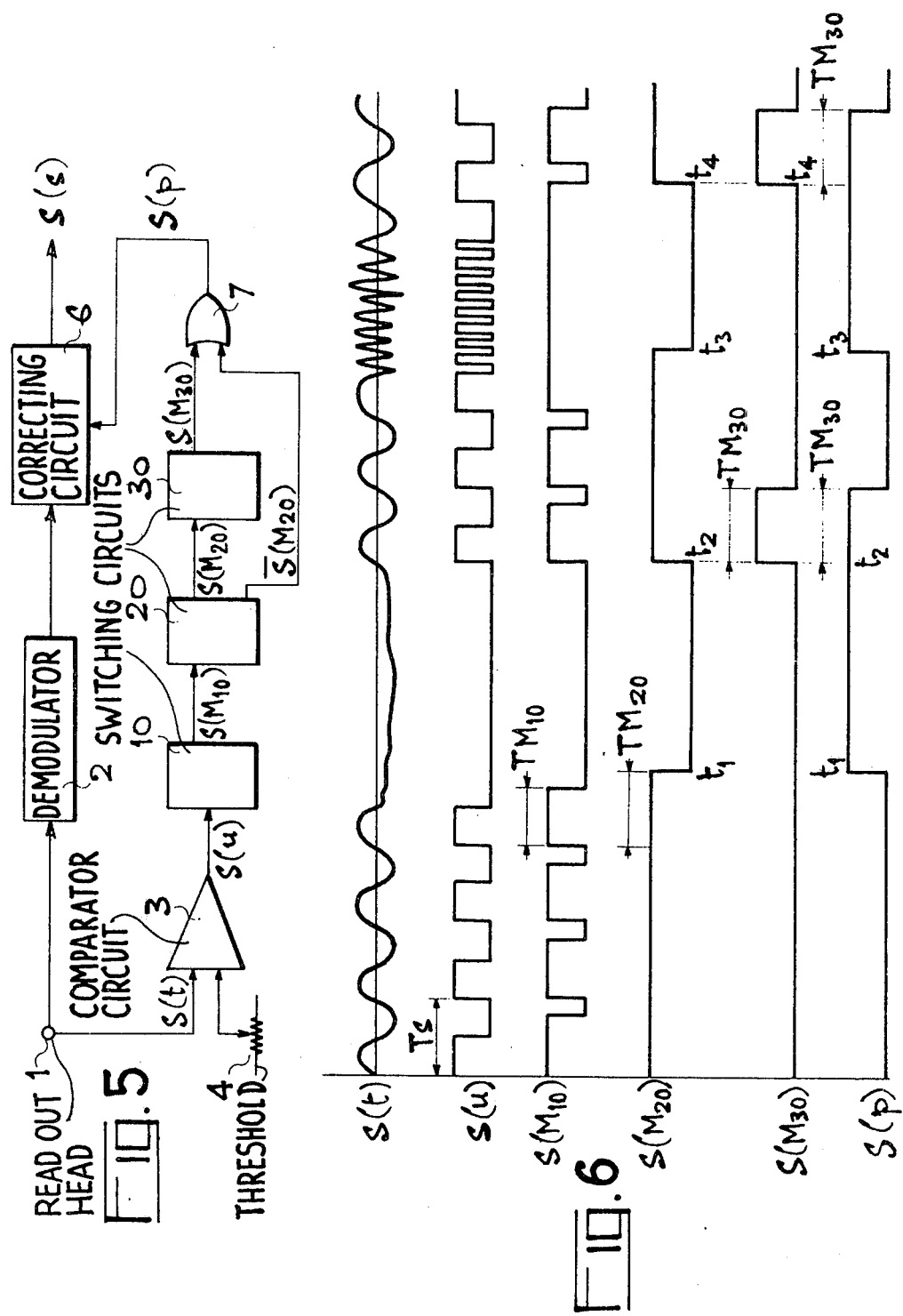

METHOD OF DETECTING DEFECTS IN READ OUT SIGNALS, AND APPARATUS FOR IMPLEMENTING THE SAME

The present invention relates to a method of detecting defects in read-out signal supplied from a head reading the information stored on a data carrier in the form of an angularly modulated carrier waveform. A signal is produced in response to such detection, which signal can activate a defect correcting system.

Certain defects in a reproduced carrier wave are constituted by drop-outs of variable duration, which may be likened to an instantaneous frequency lower than the lowest recorded frequency.

Other defects in the carrier signal may appear in the form of a series of random pulses of higher frequency than the highest recorded frequency.

In the prior art, a detection method exists which consists of utilising filters in order to detect these types of defects. However, the response time of devices of this kind is very long and the results which they yield are not very satisfactory.

In accordance with a first object of the present invention, there is provided a method of detecting defects in read-out signals supplied from a head reading the information stored upon a data carrier in the form of an angularly modulated waveform, said waveform being recorded with an instantaneous frequency lying within a predetermined frequency range; said method comprising the steps of: converting said read-out signals into a square-wave waveform having two levels; deriving from said square-wave waveform trigger pulses supplied each time a transition occurs between the first and the second of said levels; triggering with said trigger pulses a monostable switching circuit having a predetermined relaxation duration; said relaxation duration being selected outside a range of values which are the reciprocals of the frequency values of said predetermined frequency range; and controlling a defect correcting circuit receiving said read-out signals demodulated with the signal arising from the switching of said monostable switching circuit.

In accordance with a further object of the present invention, there is provided a system for implementing the method as claimed in claim 1, comprising: means for converting said read-out signals into a two level square-wave waveform; means for deriving from said two level square-wave waveform trigger pulses supplied each time a transition occurs between the first and the second of said levels; and, monostable switching means triggered with said trigger pulses.

For a better understanding of the present invention, and to show how the same may be carried into effect, reference will be made to the ensuing description and the attached figures among which:

FIG. 1 is a schematic illustration of a first embodiment of an apparatus capable of implementing a method of detecting signal defects, in accordance with the invention;

FIG. 2 illustrates the diagrams of the signals appearing at the outputs of the principal elements of the apparatus shown in FIG. 1;

FIG. 3 illustrates a schematic representation of a second embodiment of the invention;

FIG. 4 illustrates the diagrams of the signals appearing at the output of the principal elements of the apparatus shown in FIG. 3;

FIG. 5 is a schematic representation of a third embodiment of the invention;

FIG. 6 illustrates the diagrams of the signals obtained with the help of the apparatus shown in FIG. 5.

Similar elements have been given similar references in all the figures.

As FIG. 1 shows, the signal furnished by a read-out head 1 belonging to a reproduction system reading a disc carrying the recording of a video signal, is applied in a manner known per se to an angular frequency demodulator 2. The diagram of the various signals S as a function of time, as appearing at the outputs of the principal elements constituting the apparatus shown in FIG. 1, has been represented in FIG. 2. Thus, the signal $S(t)$ furnished by the read-out head 1 comprises, by way of non-limitative example and thus purely as an illustration of the invention, two frequency ranges:

one covers the intervals marked $a_1$, $a_2$ during which the recorded frequencies are correct, and the other covers the interval $b$ during which a defect in the read out signal occurs. We are concerned, in this instance, with defect in the carrier signal, which is manifested by losses in signal level of variable duration, which can be likened, as stated earlier, to an instantaneous frequency which is lower than the lowest recorded frequency.

In accordance with the invention, the signal $S(t)$ is processed by a voltage comparator 3 (FIG. 1) equipped with a threshold control 4 so that at the output of said voltage comparator the signal $S(u)$ appears in the manner shown in FIG. 2, in the form of a two level square-wave waveform forming a train of square-wave pulses the periodicity $Ts$ of which is equal to that of the read-out signal $S(t)$ for the intervals $a_1$ and $a_2$ corresponding to the ranges of correct recorded frequencies. As soon as a defect in the signal occurs, that is to say as soon as the interval $b$ commences and throughout the duration thereof, the signal $S(u)$ maintains an even level, this corresponding to the disappearance of the squarewave pulses which reappear as soon as the signal $S(t)$ returns to normal, that is to say as soon as the interval $a_2$ commences. This signal $S(u)$ is applied to the input of a switching device 5 which can occupy two states: the state 1 known as the stable state, and the metastable state 2 lasting for a duration ($TM_5$) defined by the device 5. The change from the state 1 to the state 2 is controlled by a trigger pulse applied to the input of the switching device.

At the end of the defined time $TM_5$, the monostable switching device automatically reverts to the state 1 if no fresh trigger pulse has appeared. This switching device, can in the manner described hereinafter, be constituted by a monostable trigger stage 5, whose relaxation time is $TM_5$.

In accordance with an important feature of the invention, this time $TM_5$ is slightly longer than the period $T_S$ which is the longest period of the read-out signal $S(t)$ which is identical to that of the signal $S(u)$.

Under these circumstances, if a new trigger pulse occurs during an interval of time smaller than $TM_5$, the monostable trigger stage will be maintained in the "on" state. The trigger pulses responsible for holding this condition are coincidental with either the leading edge or the trailing edge of the square-wave signal. If, by contrast, no new trigger pulse occurs during this time interval $TM_5$, the switching circuit returns to its "off" state and retains this second state until the instant at which the trigger pulse corresponding to a fresh rise portion in the signal $S(u)$ once again occurs. The diagram of the output signal S(M$_5$) furnished by the monostable switching circuit 5 has been shown in FIG. 2. This output signal S(M$_5$) from the monostable switching circuit 5, is applied to the terminals of a defect correcting circuit 6 (FIG. 1).

In the example described, for each drop-out portion, a signal is produced which lasts until the next change in state on the part of the switching circuit. This signal switches on the defect correcting circuit which, for example by means of substitution signals by way of example, in the form of delayed portions of the signal supplied by the demodulator output; such substitution signals can remedy the defects in the signal S(t).

In accordance with the invention, the signal switching on the defect correcting circuit appears at the end of the time TM$_5$ of the switching device, which time is controlled by the last trigger pulse in the correct read-out signal, that is to say at the commencement of an interval during which the holding pulses are absent, this interval corresponding to the appearance of a drop-out on the part of the read-out signal.

The device in accordance with the invention, in a manner of speaking acts as an electronic switch actuating the defect correcting device 6 as soon as a drop-out in the read-out signal S(t) appears. The corrected demodulated signal S(S) is picked off at the output of the defect correcting device 6.

In the example described earlier, the read-out signal contained only one kind of defect, but as stated earlier on in this description, a second kind of defect in the carrier signal could occur, in the form of a series of random pulses of frequency higher than the highest recorded frequency.

FIGS. 3 and 4 respectively illustrate, as far as apparatus and diagrams of the signals are concerned, how, in accordance with the invention, it is possible using this apparatus to detect these two types of defect and, on the basis of this detection, to control the defect correcting device 6.

As before, the read-out head 1 (FIG. 3) supplies the demodulator 2 with a read-out signal S(t) whose diagram has been shown in FIG. 4. The function S(t) exhibits intervals $a_1$, $a_2$, $a_3$ during which the frequency range is correct and intervals during which defects occur. These defects may take the form of disturbances occurring as frequencies which are too low (this is the case with the interval b) or disturbances which occur as frequencies which are too high (this is the case with the interval c).

The read-out signal S(t) is suitably processed as in the example described earlier, for example by means of a voltage comparator 3 with an adjustable threshold 4; the output signal then takes the form of the diagram S(u) shown in FIG. 4.

In accordance with the invention, the signals S(u) of two level square-wave shape, produced by the voltage comparator 3, are applied to the input of a system comprising a first and a second monostable switching circuit (10 and 20) with given triggering times TM$_{10}$, and TM$_{20}$. These switching circuits are cascade connected and co-operate in order to convert the signal S(u) into a signal S(M$_{20}$) which itself is applied to the defect correcting circuit 6.

In accordance with an essential feature of the invention, the triggering time TM$_{10}$ of the first monostable trigger stage M$_{10}$ is calculated so that it is very slightly shorter than the shortest period in the normal recorded signal S(t). Thus, the monostable trigger stage 10 triggers with each rising flank of the signal S(u). Bearing in mind then the shape of the signal S(u), the output signal S(M$_{10}$) from the monostable switching circuit 10 takes the form, as a function of time, shown in the diagram of FIG. 4. During the interval b, the trigger stage M$_{10}$ receives no further trigger pulse and reverts to the state 1 or "off" state (lower state). During the interval c, the monostable switching circuit M$_{10}$ is supplied with trigger pulses of shorter periodicity than its own relaxation time TM$_{10}$ and remains in the state 2 or "on" state (upper state). A second retriggerable monostable switching circuit 20 is arranged in series with the first 10. In accordance with an important feature of the invention, the triggering time TM$_{20}$ of this second monostable switching circuit 20 is slightly longer than the longest periodicity of the normal recorded signal S(t) (as also was TM$_5$ in the first example). In the absence of any disturbances (case of $a_1$M$_{10}$, $a_2$M$_{10}$, $a_3$M$_{10}$), the monostable switching circuit 20 is supplied with trigger pulses and the output remains in the "on" state 2 (upper state in the described example). Conversely, in the presence of disturbances (case of b M$_{10}$ and c M$_{10}$), the monostable switching circuit 20 is not supplied with trigger pulses for a time equal to its own relaxation time TM$_{20}$. When the time TM$_{20}$ has elapsed, the monostable switching circuit 20 reverts to the "off" state 1 (lower state) automatically, and in changing state generates a signal which, as in the variant embodiment described earlier, activates the defect correcting device 6.

It may be a good idea to lengthen the activating signal by a fixed time in order to make it possible for the demodulation circuits to return to a state of readiness.

The apparatus shown in FIG. 5 along with the diagrams of the output signals produced by its principal elements, makes it possible to achieve this result. An apparatus of this kind comprises the same elements as the kinds of apparatus described earlier but also comprises a third monostable switching circuit which has a relaxation time TM$_{30}$. In the example described it is controlled by the rise flanks of the output pulses from the monostable switching circuit 20. TM$_{30}$ corresponds to the time by which it is desired to lengthen the period for which the activating signal is applied to the activating correcting device 6, the start of the defect signal occuring, as in the preceding variant embodiment, at the instant at which the switching circuit M$_{20}$ automatically reverts to the off state. An OR-gate (7) is supplied with the output signals SM$_{20}$ from the monostable switching circuit 20 and SM$_{30}$ from that 30. The OR-gate (7) produces at its output the signal by means of which the defect correcting device 6 is controlled. Up to the monostable switching circuit 30, everything happens in an identical manner to that which has been described already in the context of the version illustrated in FIGS. 3 and 4. The description corresponding to this section of the system has therefore not been repeated and the description in fact commences at the output of the monostable switching circuit 20.

With each rise flank in the signal S(M$_{20}$), the monostable switching circuit M$_{30}$ changes state and remains in the on state (upper state) for a time equal to TM$_{30}$ before returning to the off state (lower state) automatically.

The OR-gate (7) processes the two signals from the monostable switching circuits M$_{20}$ and M$_{30}$, in the following fashion;

The signal S ($M_{30}$) is applied directly to the input of the gate 7 whilst the complementary output signal $\overline{S}$ ($M_{20}$) is applied to the second input of said gate (7). The signal produced by said gate 7 then takes the form shown at S(p) in FIG. 6. At the time $t_1$ corresponding to the automatic triggering of the output trigger stage, the change in the level of the output signal coming from the gate 7 produces an error signal which activates the defect correcting circuit 6 during the time interval separating $t_1$ and $t_2$, plus the excess time $TM_{30}$.

An identical result is obtained with the following defect: an error signal appears between the time $t_3$ and the time $t_4$, increased by the time $TM_{30}$.

The triggering time of currently available monostable switching circuits used in accordance with the invention is small enough to avoid the use of a delay line for the purpose of restoring the defect control signal to an in-phase condition with the disturbance in the read-out signal. The delay introduced by the demodulating circuit 2 is quite sufficient for this purpose.

A device in accordance with the invention can be used more particularly to improve the read-out qualities of the signals furnished by the optical read-out pick-up of a reproduction system reading a disc carrying the recording of a video frequency signal.

What we claim is:

1. A method of detecting defects in read-out signals supplied from a head reading the information stored upon a data carrier in the form of an angularly modulated waveform, said waveform being recorded with an instantaneous frequency lying within a predetermined frequency range; said method comprising the steps of: converting said read-out signals into a square-wave waveform having two levels; demodulating said square-wave waveform; deriving from said square-wave waveform trigger pulses supplied each time a transition occurs from the first to the second of said levels; triggering with said trigger pulses a monostable switching circuit having a predetermined relaxation duration; said relaxation duration being selected outside a range of values which are the reciprocals of the frequency values of said predetermined frequency range; and controlling a defect correcting circuit receiving said read-out signals demodulated with the switching signal arising from the switching of said monostable switching circuit.

2. A method as claimed in claim 1, wherein said predetermined relaxation duration is higher than the reciprocal of the lower limit of said predetermined frequency range.

3. A method as claimed in claim 1, wherein said monostable switching circuit triggers a further monostable switching circuit; said predetermined relaxation duration being smaller than the reciprocal of the upper limit of said predetermined frequency range; the relaxation duration of said further monostable switching circuit being higher than the reciprocal of the lower limit of said predetermined frequency range.

4. A method as claimed in claim 1, wherein said defect correcting circuit is controlled with an OR-gate; the complemented value of said switching signal being applied to one input of said OR-gate; said switching signal controlling a further input of said OR-gate through the medium of another monostable switching circuit; the output of said OR-gate controlling said defect correcting circuit.

5. A method as claimed in claim 1, wherein said read out signals are obtained from the optical read-out of a record carrying an optically recorded track.

6. A method as claimed in claim 1, wherein said read out signals are obtained from the playing back of a magnetic tape recording.

7. A system for detecting defects undergone by read-out signals supplied from a head reading the information stored upon a data carrier in the form of an angularly modulated waveform, said waveform being recorded with an instantaneous frequency lying within a predetermined frequency range; said system comprising: means for converting said read-out signals into a two level square-wave waveform; means for deriving from said two level square-wave waveform trigger pulses supplied each time a transition occurs between the first and the second of said levels; and, monostable switching means triggered with said trigger pulses.

8. A system as claimed in claim 7, which comprises: a read-out head delivering said read-out signals, means for demodulating said two level square-wave waveform, and a defect correcting circuit receiving said read-out signals upon being demodulated; said defect correcting circuit being controlled by said monostable switching means.

9. A system as claimed in claim 8, wherein said read out head is an optical read out head.

* * * * *